(No Model.)
J. T. McMURTRY.
NUT LOCK.
No. 595,193. Patented Dec. 7, 1897.
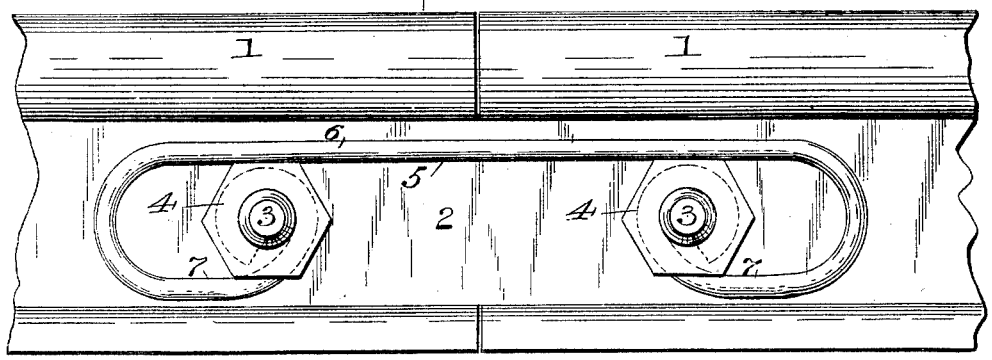
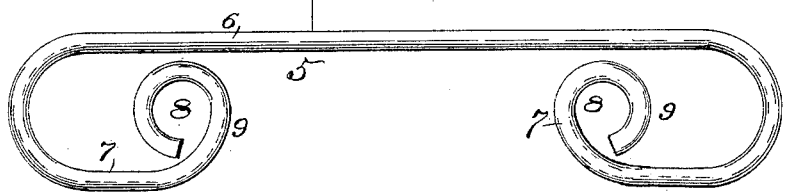
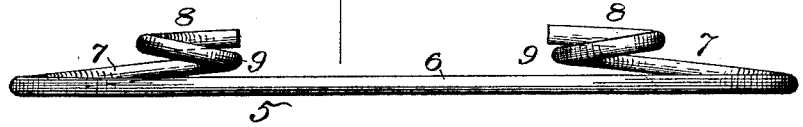
Witnesses:
Franck L. Ourand.
Jos. L. Coombs.
Inventor:
John T. McMurtry,
By Louis Bagger & Co.
Attorneys.

UNITED STATES PATENT OFFICE.

JOHN T. McMURTRY, OF CONNEAUT, OHIO.

NUT-LOCK.

SPECIFICATION forming part of Letters Patent No. 595,193, dated December 7, 1897.

Application filed February 25, 1897. Serial No. 625,059. (No model.)

*To all whom it may concern:*

Be it known that I, JOHN T. MCMURTRY, a citizen of the United States, and a resident of Conneaut, in the county of Ashtabula and State of Ohio, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification.

My invention relates to nut-locks for preventing backward movement or unscrewing of the nuts applied to the bolts or railway-rails; and its object is to provide a combined nut-lock and washer which will effectually prevent the nuts from working loose.

The invention consists, essentially, in a spring-metal bar having the ends bent inwardly and formed into loops and formed near said loops with a bend or offset, so that the loops will be in a different plane from the bar, as hereinafter fully described and claimed.

In the accompanying drawings, Figure 1 is a side elevation showing two connected railway-rails provided with my improvements. Fig. 2 is a similar view of the nut-lock, removed. Fig. 3 is a plan view of the same.

In the said drawings the reference-numeral 1 designates two railway-rails, 2 the fish-plate, 3 the bolts, and 4 the nuts, which may be of any ordinary or suitable construction.

The numeral 5 designates the combined nut-lock and washer, consisting of a spring-metal bar comprising a straight or horizontal portion 6, having the ends curved inwardly, forming curved arms 7, the extremities of which are bent backwardly into circular form, forming loops 8 of a diameter approximating that of the bolts. Intermediate the loops or coils and the arms 7 the bar is bent or formed with an offset 9, so that the loops will stand away from or be in a different vertical plane from the straight portion 6 of the bar.

In using the device the bolts are passed through the rails and fish-plate, as usual, and the locking-bar applied by passing the loops over the threaded ends of the bolts, with the coils 8 resting against the fish-plate. The nuts are then placed on the bolts and screwed home by means of a wrench, forcing the loops or coils tightly against the fish-plate and the inner faces of the nuts, the bar 5 also engaging with the nuts. By this means the nuts will be securely held in place and prevented from working loose under ordinary circumstances. In screwing up the nuts, as described, the bar will give, so as to allow the corners of the nuts to pass the same, and when screwed home the resiliency of the bar will cause it to bear on the side of the nuts and thus aid in preventing them from turning.

It will be noted that the coils 8 are compressed between the nuts and fish-plates and thus serve as coiled springs, so that should the horizontal arm become broken said coils will still serve by their resiliency to keep the nuts from turning or working loose.

As will be seen in Fig. 3, the coils 8 extend or project beyond the horizontal portion 6, so that when the nuts are screwed home, clamping said coils between their inner faces and the fish-plate, the said horizontal portion will lie in a different plane from the coils, so as to engage with the sides of the nuts.

Having thus fully described my invention, what I claim is—

In a nut-lock, the combination with the rails, the fish-plates, the bolt and the nut, of the lock consisting of a spring-metal horizontal rod or bar having its ends bent downwardly and then inclined backwardly, at an angle to said horizontal arm and the extremities bent into coils embracing the bolt and confined between the nut and fish-plate and the upper sides of the nut bearing against said horizontal arm, substantially as described.

In testimony that I claim the foregoing as my own, I have hereunto affixed my signature in presence of two witnesses.

JOHN T. McMURTRY.

Witnesses:
J. H. FISHER,
E. R. JONES.